(12) United States Patent
Pudvah

(10) Patent No.: US 12,158,078 B2
(45) Date of Patent: Dec. 3, 2024

(54) COMPRESSOR CASE WITH A COOLING CAVITY

(71) Applicant: RTX Corporation, Farmington, CT (US)

(72) Inventor: Bernard W. Pudvah, Portland, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/183,612

(22) Filed: Mar. 14, 2023

(65) Prior Publication Data
US 2024/0309779 A1    Sep. 19, 2024

(51) Int. Cl.
| F01D 25/14 | (2006.01) |
| B23P 15/00 | (2006.01) |
| F01D 9/04 | (2006.01) |
| F01D 25/12 | (2006.01) |
| F01D 25/24 | (2006.01) |

(52) U.S. Cl.
CPC .............. *F01D 25/14* (2013.01); *B23P 15/00* (2013.01); *F01D 9/041* (2013.01); *F01D 25/12* (2013.01); *F01D 25/24* (2013.01); *F05D 2230/21* (2013.01); *F05D 2260/20* (2013.01)

(58) Field of Classification Search
CPC .............. B23P 15/00; Y10T 29/49236; Y10T 29/49984
See application file for complete search history.

(56) References Cited

U.S. PATENT DOCUMENTS

| 2,041,699 | A | | 5/1936 | Dahlstrand |
| 3,942,908 | A | * | 3/1976 | Pilarczyk ............... F04D 25/04 |
| | | | | 417/409 |
| 4,169,692 | A | | 10/1979 | McDonough et al. |
| 4,856,962 | A | | 8/1989 | McDow |
| 5,517,817 | A | | 5/1996 | Hines |
| 5,967,743 | A | | 10/1999 | Meylan |
| 9,239,006 | B2 | | 1/2016 | Fritsch |

(Continued)

FOREIGN PATENT DOCUMENTS

GB    926947 A    5/1963

OTHER PUBLICATIONS

Extended European Search Report issued in European Application No. 24163685.1 dated Jul. 2, 2024.

*Primary Examiner* — Sarang Afzali
(74) *Attorney, Agent, or Firm* — CANTOR COLBURN LLP

(57) ABSTRACT

A method of manufacturing a compressor. A member is cast having forward and aft annular portions. A cavity forward wall extends from the forward annular portion to a first inner end. A cavity aft wall extends from the aft annular portion to a second inner end. A cavity outer wall extends between the forward and aft annular portions and defines an outer aperture. A cavity inner wall is cast and welded between the cavity forward and aft walls such that the cavity inner wall is offset from the first and second inner ends of the cavity forward and aft walls to form a U-shaped end channel. The compressor case is capable of receiving a vane so that a trunnion bearing extends from a vane root to a trunnion bearing outer end, through the inner aperture in the cavity inner wall and the outer aperture in the cavity outer wall.

4 Claims, 6 Drawing Sheets

(56) References Cited

U.S. PATENT DOCUMENTS

| | | |
|---|---|---|
| 10,227,888 B2 | 3/2019 | Holowczak et al. |
| 10,865,701 B2 * | 12/2020 | Hu ................... F04D 29/584 |
| 11,022,145 B2 * | 6/2021 | Maliniak ............ F01D 17/162 |
| 2005/0091848 A1 | 5/2005 | Nenov et al. |
| 2007/0160463 A1 | 7/2007 | Jahns |
| 2008/0206045 A1 | 8/2008 | Foucher |
| 2014/0234085 A1 | 8/2014 | Maliniak et al. |
| 2018/0363507 A1 | 12/2018 | Roussille et al. |
| 2022/0333528 A1 | 10/2022 | Chaudhari et al. |

* cited by examiner

COMPRESSOR CASE WITH A COOLING CAVITY

BACKGROUND

Exemplary embodiments of the present disclosure pertain to the art of compressor architecture for gas turbine engines and more specifically to a compressor case with a cooling cavity.

Blade tip clearance control in compressor cases, e.g., accounting for movement of the blade, may be controlled by adjusting a wall thickness of the case. For example, thicker or thinner cases can be manufactured which result in speeding up or slowing down the system response. However, such solutions may require complex manufacturing processes and may be costly. Options to modify the exterior of the cases to provide for such control may be limited because of the requirement to mount engine accessories to the cases.

BRIEF DESCRIPTION

Disclosed is a compressor comprising: a case having: a forward annular portion having an aft end: an aft annular portion having a forward end that is axially spaced apart from the forward annular portion: a cavity forward wall extending radially inward from the aft end of the forward annular portion to a first inner end: a cavity aft wall extending radially inward from the forward end of the aft annular portion to a second inner end; and a cavity outer wall extending axially between the forward and aft annular portions and defining an outer aperture: a cavity inner wall extending axially between the cavity forward wall and the cavity aft wall, at or near the first and second inner ends, and defining an inner aperture, wherein a cooling cavity is defined between the cavity forward wall, the cavity aft wall, the cavity outer wall and the cavity inner wall; and a vane stage disposed within the compressor and axially aligned with the cooling cavity, wherein the vane stage includes a vane extending from a tip to a root, and a trunnion bearing extending radially from the root to a trunnion bearing outer end, through the inner aperture in the cavity inner wall and the outer aperture in the cavity outer wall.

In addition to one or more of the above disclosed aspects of the compressor or as an alternate, the forward annular portion, the aft annular portion, the cavity inner wall, the cavity forward wall and the cavity aft wall are cast as a unitary member, wherein the cavity inner wall is offset from the first and second inner ends of the cavity forward wall and the cavity aft wall to form a U-shaped end channel that surrounds the root, and the cavity outer wall is welded between the cavity forward wall and the cavity aft wall.

In addition to one or more of the above disclosed aspects of the compressor or as an alternate, the forward annular portion, the aft annular portion, the cavity outer wall, the cavity forward wall and the cavity aft wall are cast as a unitary member, and the cavity inner wall is welded between the cavity forward wall and the cavity aft wall, wherein the cavity inner wall is offset from the first and second inner ends of the cavity forward wall and the cavity aft wall to form a U-shaped end channel that surrounds the root.

In addition to one or more of the above disclosed aspects of the compressor or as an alternate, the forward annular portion, the aft annular portion, the cavity outer wall, the cavity forward wall and the cavity aft wall are cast as a unitary member, and the cavity inner wall is welded to the first and second inner ends of the cavity forward and aft walls, and the cavity inner wall defines a U-shaped end channel that surrounds the root, with an axial base, a radial forward leg that is aligned with the cavity forward wall, and a radial aft leg that is aligned with the cavity aft wall.

In addition to one or more of the above disclosed aspects of the compressor or as an alternate, the cavity outer wall is thinner than the cavity forward wall, the cavity aft wall and the cavity inner wall.

In addition to one or more of the above disclosed aspects of the compressor or as an alternate, the compressor includes a sleeve surrounding the trunnion bearing and extending from the root to a location that is at or near the trunnion bearing outer end.

In addition to one or more of the above disclosed aspects of the compressor or as an alternate, the compressor includes a port, formed in the cavity outer wall, for directing an airflow into the cooling cavity.

Further disclosed is a method of manufacturing a compressor case, including: casting a unitary member that includes: a forward annular portion of the case; an aft annular portion of the case: a cavity forward wall extending radially inward from the forward annular portion to a first inner end: a cavity aft wall extending radially inward from the aft annular portion to a second inner end; and one of: a cavity outer wall extending axially between the forward and aft annular portions and defining an outer aperture; and a cavity inner wall extending axially between the cavity forward wall and the cavity aft wall, at or near the first and second inner ends, and defining an inner aperture: separately casting, and welding between the cavity forward wall and the cavity aft wall, another of: the cavity outer wall; and the cavity inner wall, wherein a cooling cavity is defined between the cavity forward wall, the cavity aft wall, the cavity outer wall and the cavity inner wall; and installing a vane, of a vane stage, within the case so that a trunnion bearing extends radially from a root of the vane to a trunnion bearing outer end, through the inner aperture in the cavity inner wall and the outer aperture in the cavity outer wall.

In addition to one or more of the above disclosed aspects of the method or as an alternate, the method includes casting the unitary member to include the cavity inner wall such that it is offset from the first and second inner ends of the cavity forward wall and the cavity aft wall to form a U-shaped end channel.

In addition to one or more of the above disclosed aspects of the method or as an alternate, the method includes separately casting the cavity inner wall and welding it between the cavity forward wall and the cavity aft wall such that it is offset from the first and second inner ends of the cavity forward wall and the cavity aft wall to form a U-shaped end channel.

In addition to one or more of the above disclosed aspects of the method or as an alternate, the method includes separately casting the cavity inner wall to define a U-shaped end channel with an axial base, a radial forward leg that is aligned with the cavity forward wall, and a radial aft leg that is aligned with the cavity aft wall, and welding the cavity inner wall to the first and second inner ends of the cavity forward and aft walls.

In addition to one or more of the above disclosed aspects of the method or as an alternate, the method includes casting the cavity outer wall so that it is thinner than the cavity forward wall, the cavity aft wall and the cavity inner wall.

In addition to one or more of the above disclosed aspects of the method or as an alternate, installing the vane includes: installing a sleeve that surrounds the trunnion bearing and extends from the root to a location that is at or near the trunnion bearing outer end.

In addition to one or more of the above disclosed aspects of the method or as an alternate, the method includes casting the cavity outer wall with a port for directing airflow into the cooling cavity.

Further disclosed is a gas turbine engine, including: a compressor that includes a compressor case and a vane stage, wherein the case includes: a forward annular portion having an aft end: an aft annular portion having a forward end that is axially spaced apart from the forward annular portion: a cavity forward wall extending radially inward from the aft end of the forward annular portion to a first inner end: a cavity aft wall extending radially inward from the forward end of the aft annular portion to a second inner end; and a cavity outer wall extending axially between the forward and aft annular portions and defining an outer aperture: a cavity inner wall extending axially between the cavity forward wall and the cavity aft wall, at or near the first and second inner ends, and defining an inner aperture, wherein a cooling cavity is defined between the cavity forward wall, the cavity aft wall, the cavity outer wall and the cavity inner wall; and the vane stage disposed within the compressor and axially aligned with the cooling cavity, wherein the vane stage includes a vane extending from a tip to a root, and a trunnion bearing extending radially from the root to a trunnion bearing outer end, through the inner aperture in the cavity inner wall and the outer aperture in the cavity outer wall.

In addition to one or more of the above disclosed aspects of the engine or as an alternate, the forward annular portion, the aft annular portion, the cavity inner wall, the cavity forward wall and the cavity aft wall are cast as a unitary member, wherein the cavity inner wall is offset from the first and second inner ends of the cavity forward wall and the cavity aft wall to form a U-shaped end channel that surrounds the root, and the cavity outer wall is welded between the cavity forward wall and the cavity aft wall.

In addition to one or more of the above disclosed aspects of the engine or as an alternate, the forward annular portion, the aft annular portion, the cavity outer wall, the cavity forward wall and the cavity aft wall are cast as a unitary member, and the cavity inner wall is welded between the cavity forward wall and the cavity aft wall, wherein the cavity inner wall is offset from the first and second inner ends of the cavity forward wall and the cavity aft wall to form a U-shaped end channel that surrounds the root.

In addition to one or more of the above disclosed aspects of the engine or as an alternate, the forward annular portion, the aft annular portion, the cavity outer wall, the cavity forward wall and the cavity aft wall are cast as a unitary member, and the cavity inner wall is welded to the first and second inner ends of the cavity forward and aft walls, and the cavity inner wall defines a U-shaped end channel that surrounds the root, with an axial base, a radial forward leg that is aligned with the cavity forward wall, and a radial aft leg that is aligned with the cavity aft wall.

In addition to one or more of the above disclosed aspects of the engine or as an alternate, the cavity outer wall is thinner than the cavity forward wall, the cavity aft wall and the cavity inner wall.

In addition to one or more of the above disclosed aspects of the engine or as an alternate, the engine includes a port, formed in the cavity outer wall, for directing an airflow into the cooling cavity.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
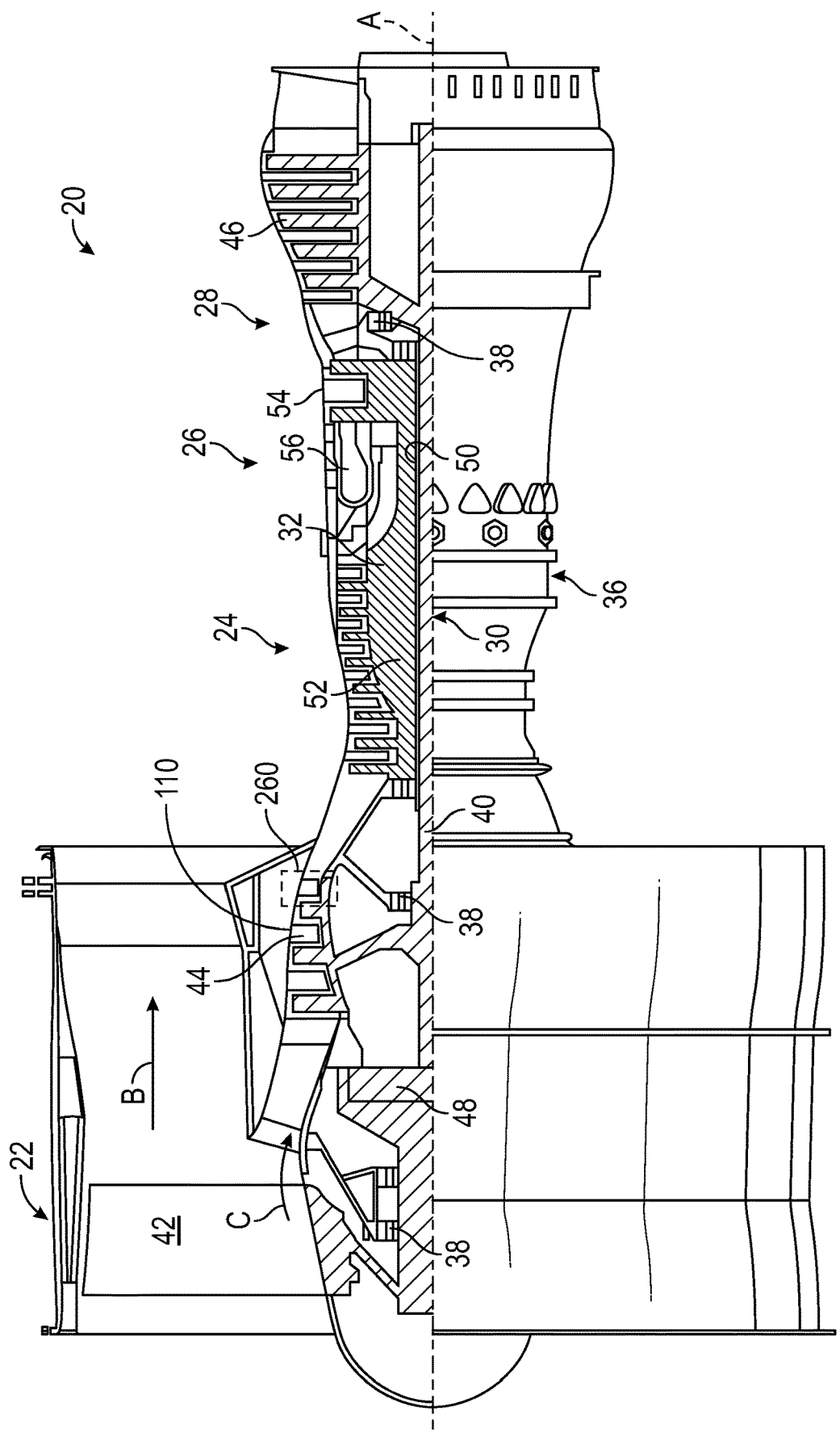
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]0.5. The "Low corrected fan tip speed" as disclosed herein according to one non-limiting embodiment is less than about 1150 ft/second (350.5 m/sec).

Figure 2:
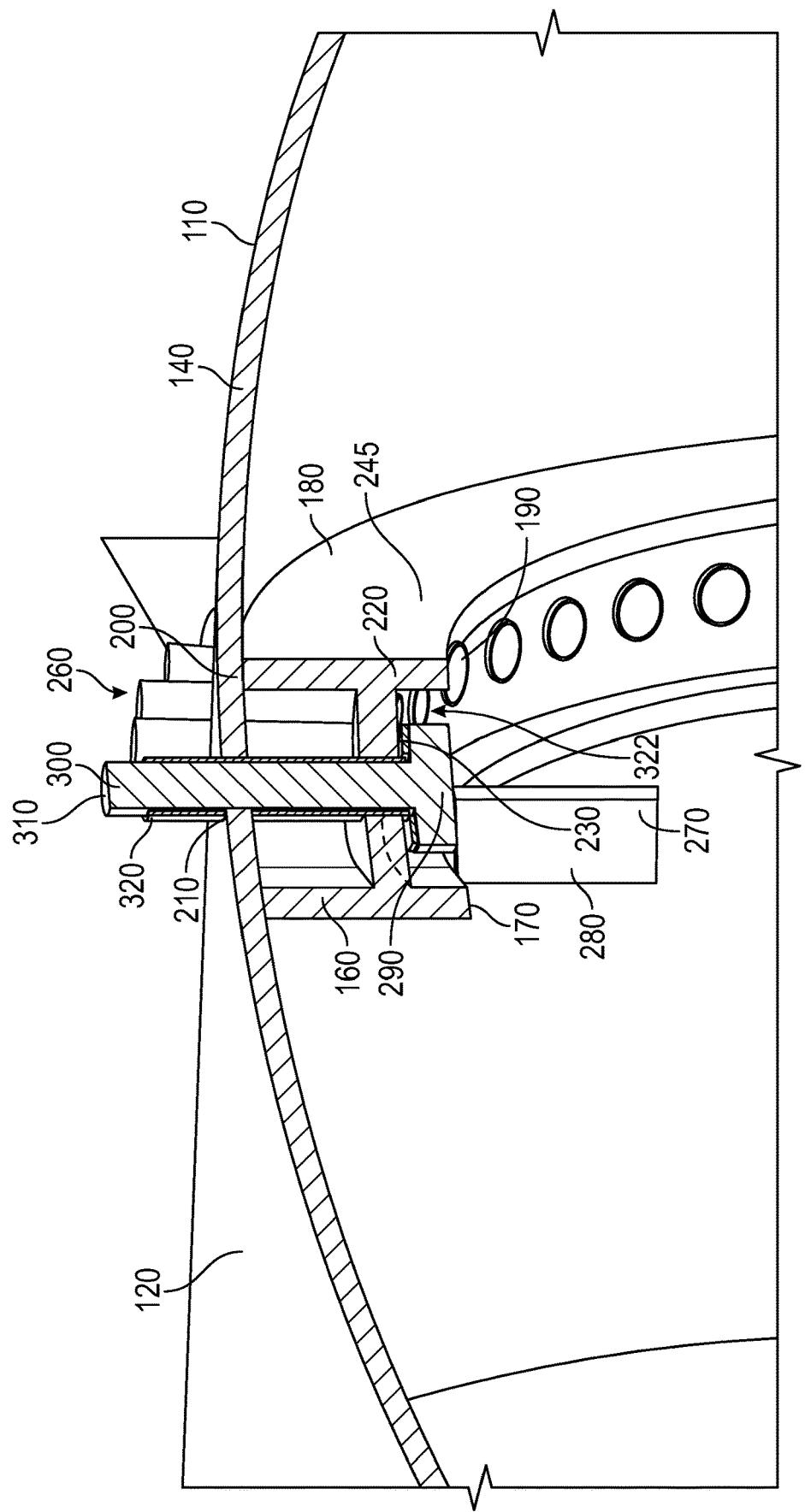
FIG. 2 is a section of a compressor case formed with a cooling cavity according to the disclosed embodiments.
Figure 3:
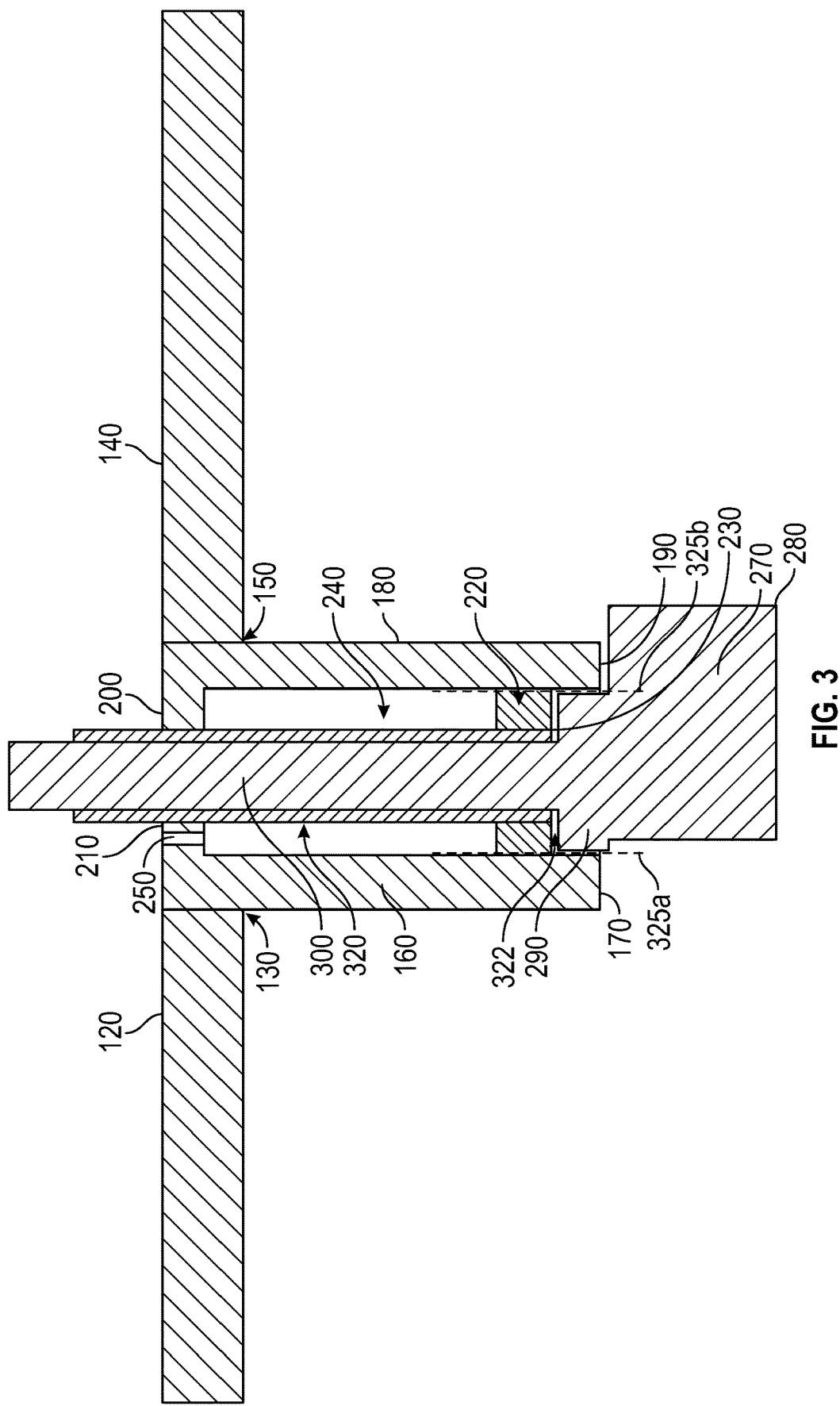
FIG. 3 is a section of the compressor case formed with the cooling cavity according to one embodiment.

Turning to FIGS. 2 and 3, the compressor 44 includes a case 110. The case 110 has a forward annular portion 120. The forward annular portion 120 has an aft end 130 (FIG. 3). The case 110 has an aft annular portion 140. The aft annular portion 140 has a forward end 150 (FIG. 3) that is axially spaced apart from the aft end 130 of the forward annular portion 120.

The case 110 has a cavity forward wall 160 extending radially inward from the aft end 130 of the forward annular portion 120 to a first inner end 170. A cavity aft wall 180 extends radially inward from the forward end 150 of the aft annular portion 140 to a second inner end 190. A cavity outer wall 200 extends axially between the forward annular portion 120 and the aft annular portion 140 and defines an outer aperture 210. A cavity inner wall 220 extends axially between the cavity forward wall 160 and the cavity aft wall 180, at or near the first and second inner ends 170, 190, and defines an inner aperture 230. A cooling cavity 240 is defined between the cavity forward wall 160, the cavity aft wall 180, the cavity outer wall 200 and the cavity inner wall 220. The walls surrounding the cooling cavity 240 may be collectively referred to as cavity walls 245. A port 250 (FIG. 3) may be formed in the cavity outer wall 200. The port 250 may be utilized for directing an airflow, e.g., cooling or heating, into the cooling cavity 240. As shown in FIG. 3, the cavity outer wall 200 may be thinner than the cavity forward wall 160, the cavity aft wall 180 and the cavity inner wall 220.

A vane 270 of a vane stage 260 (FIG. 1) is disposed within the case 110 and is axially aligned with the cooling cavity 240. The vane 270 extends from a tip 280 to a root 290. A trunnion bearing 300 extends radially from the root 290 to a trunnion bearing outer end 310, through the inner aperture 230 in the cavity inner wall 220 and the outer aperture 210 in the cavity outer wall 200. A sleeve 320 surrounds the trunnion bearing 300 and extends from the root 290 to a location that is at or near the trunnion bearing outer end 310. The sleeve 320 may be metal.

The aspects of FIG. 2 are generally applicable to all embodiments herein. In the embodiment shown in FIG. 3, the forward annular portion 120, the aft annular portion 140, the cavity outer wall 200, the cavity forward wall 160 and the cavity aft wall 180 are cast as a unitary member. The cavity inner wall 220 is separately cast and welded between the cavity forward wall 160 and the cavity aft wall 180. The cavity inner wall 220 is radially offset from the first and second inner ends 170, 190 by a distance that is substantially equivalent to the thickness of the root 290, creating a U-shaped end channel 322 that surrounds the root 290. The weld lines 325a, 325b are shown for this embodiment, which are only around the cavity inner wall 220.

Figure 4:
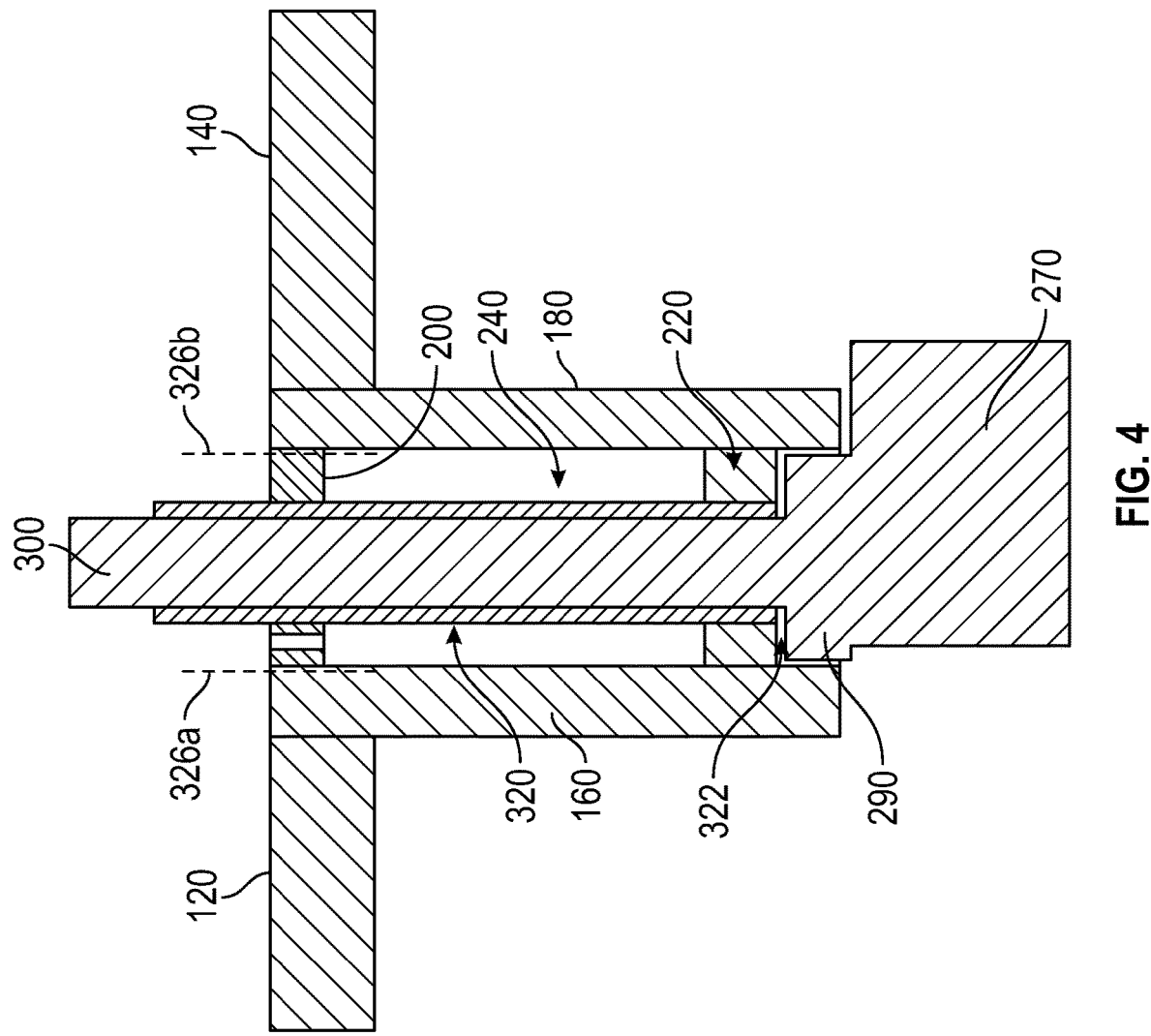
FIG. 4 is a section of the compressor case formed with the cooling cavity according to another embodiment.

In the embodiment shown in FIG. 4, the forward annular portion 120, the aft annular portion 140, the cavity inner wall 220, the cavity forward wall 160 and the cavity aft wall 180 are cast as a unitary member. As with the embodiment of FIG. 3, the cavity inner wall 220 is radially offset from the first and second inner ends 170, 190 by the distance that is substantially equivalent to the thickness of the root 290, creating the U-shaped end channel 322 that surrounds the root 290. The cavity outer wall 200 is welded between the cavity forward wall 160 and the cavity aft wall 180. The weld lines 326a, 326b are shown for this embodiment, which are only around the cavity outer wall 200. All other aspects of the embodiment of FIG. 4, such as other aspects of the cooling cavity 240, the forward and aft annular portions 120, 140, the vane 270, the trunnion bearing 300 surrounded by the sleeve 320 are the same as those in FIG. 3.

Figure 5:
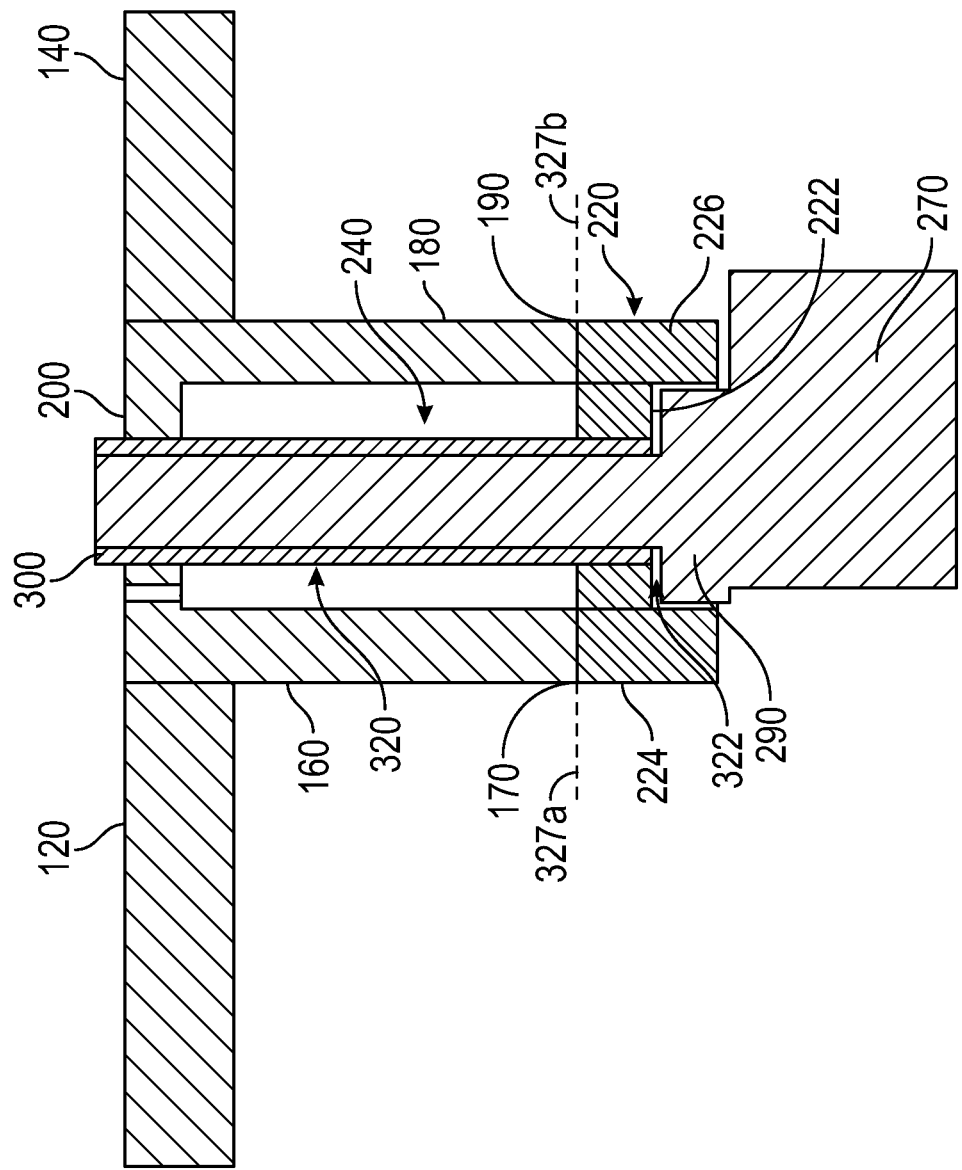
FIG. 5 is a section of the compressor case formed with the cooling cavity according to a further embodiment.

In the embodiment shown in FIG. 5, the forward annular portion 120, the aft annular portion 140, the cavity outer wall 200, the cavity forward wall 160 and the cavity aft wall 180 are cast as a unitary member. The cavity inner wall 220 defines the U-shaped end channel 322 that surrounds the root 290. In FIGS. 3-4, this configuration is formed by the combination of the cavity inner wall 220, the cavity forward wall 160 and the cavity aft wall 180. The cavity inner wall 220 has an axial base 222, a radial forward wall or leg 224 that is aligned with the cavity forward wall 160, and a radial aft wall or leg 226 that is aligned with the cavity aft wall 180. The weld lines 327a, 327b are shown for this embodiment, which are axial and between the cavity inner wall 220 and the first and second inner ends 170, 190. In this embodiment, the cavity forward and aft walls 160, 180 are shorter than the cavity forward and aft walls 160, 180 in the other disclosed embodiments, e.g., in FIGS. 3-4. That is, the combination of the cavity forward wall 160 and the radial forward leg 224 in the embodiment of FIG. 5 has the same length as the cavity forward wall 160 of the embodiments in FIGS. 3-4. Similarly, the combination of the cavity aft wall 180 and the radial aft leg 226 in the embodiment of FIG. 5 has the same length as the cavity aft wall 180 of the embodiments in FIGS. 3-4. All other aspects of the embodiment of FIG. 5, such as other aspects of the cooling cavity 240, the forward and aft annular portions 120, 140, the vane 270, the trunnion bearing 300 surrounded by the sleeve 320 are the same as those in FIG. 3.

Figure 6:
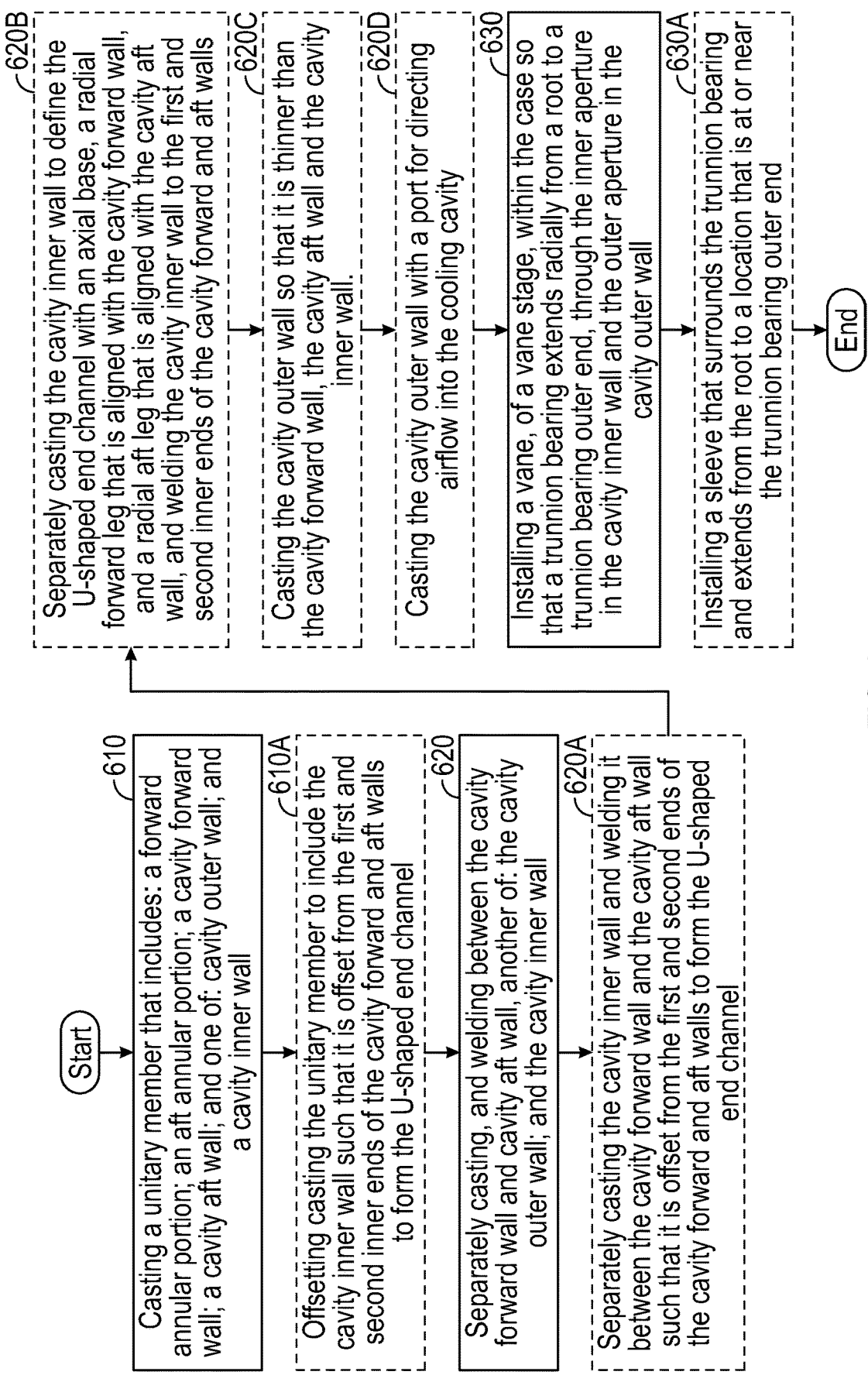
FIG. 6 is a flowchart showing a method of manufacturing the compressor case.

Turning to FIG. 6, a flowchart shows a method of manufacturing the compressor case 110. As shown in block 610, the method includes casting a unitary member that includes the forward annular portion 120 of the case 110, the aft annular portion 140 of the case 110, the cavity forward wall 160, and the cavity aft wall 180. As indicated above, the cavity forward wall 160 extends radially inward from the forward annular portion 120 to the first inner end 170 and the cavity aft wall 180 extends radially inward from the aft annular portion 140 to the second inner end 190. The unitary member includes one of the cavity outer wall 200 and the cavity inner wall 220. As indicated, the cavity outer wall 200 extends axially between the forward annular portion 120 and the aft annular portion 140, and defines an outer aperture 210. The cavity inner wall 220 extends axially between the cavity forward wall 160 and the cavity aft wall 180, at or near the first and second inner ends 170, 190, and defines the inner aperture 230.

As shown in block 610A, the step of casting of the unitary member (block 610) may include casting the unitary member to include the cavity inner wall 220 such that it is offset from the first and second inner ends 170, 190 of the cavity forward and aft walls 160, 180 to form the U-shaped end channel 322.

As shown in block 620, the method includes separately casting, and welding between the cavity forward wall 160 and cavity aft wall 180, another of the cavity outer wall 200 and the cavity inner wall 220. The cooling cavity 240 is defined between the cavity forward wall 160, the cavity aft wall 180, the cavity outer wall 200 and the cavity inner wall 220.

As shown in block 620A, the step of separately casting one of the walls and welding it to the unitary member (block 620) may include separately casting the cavity inner wall 220. This step may include welding cavity inner wall 220 between the cavity forward wall 160 and the cavity aft wall 180 such that it is offset from the first and second inner ends 170, 190 of the cavity forward and aft walls 160, 180. This configuration forms the U-shaped end channel 322.

As shown in block 620B, the step of separately casting one of the walls and welding it to the unitary member (block 620) may include separately casting the cavity inner wall 220 to define the U-shaped end channel 322. The cavity inner wall 220 in this embodiment includes the axial base 222, the radial forward leg 224 that is aligned with the cavity forward wall 160, and the radial aft leg 226 that is aligned with the cavity aft wall 180. This step further includes welding the cavity inner wall 220 to the first and second inner ends 170, 190 of the cavity forward and aft walls 160, 180.

As shown in block 620C, the cavity outer wall 200, whether cast as part of the unitary member (block 610) or separately cast and welded to the unitary member (block 620), may be cast so that it is relatively thin. For example, it may be thinner than the cavity forward wall 160, the cavity aft wall 180 and the cavity inner wall 220. As shown in block 620D, the cavity outer wall 200, whether cast as part of the unitary member (block 610) or separately cast and welded to the unitary member (block 620), may be cast to include the port 250 for directing airflow into the cooling cavity 240.

As shown in block 630, the method includes installing the vane 270, of the vane stage 260, within the case 110. When installed, the trunnion bearing 300 extends radially from the root 290 of the vane 270 to the trunnion bearing outer end 310, through the inner aperture 230 in the cavity inner wall 220 and the outer aperture 210 in the cavity outer wall 200. As shown in block 630A, installing the vane (block 630) may include installing a sleeve 320 that surrounds the trunnion bearing 300 and extends from the root 290 to a location that is at or near the trunnion bearing outer end 310.

The disclosed configuration provides a cooling cavity 240 defined by the cavity walls 245, each of which may form a full hoop, that surrounds a trunnion bearing 300, which connects a vane 270 of a vane stage 260 to a compressor case 110. The configuration allows for the inclusion of plumbing connections, e.g., a port 250, at the radial exterior of the compressor case 110 to pump cooling or heating air through the cooling cavity 240. The embodiments provide minimal component interference at the external side of the compressor case 110, and thereby minimally impact an ability to mount the external components. Airflow within the cooling cavity 240 may control the temperature of the compressor case 110 and allow for optimal tip clearance. The cooling cavity 240 may be closed by welding a cavity outer wall 200 or cavity inner wall 220, which may be considered a ring shaped cap, over an open inner or outer side of the cooling cavity 240. The configuration of the embodiments enables the cavity walls 245 of the cooling cavity 240 to be sized relatively thin, e.g., compared with the rest of the case 110 and each other. For example, the cavity outer wall 200 may be relatively thin compared with the rest of the cavity walls 245.

Benefits of the disclosed configuration that defines the cooling cavity 240 include allowing for the case 110 to be actively cooled and or heated to thermally match a temperature of a rotor stack of the compressor 44 to provide better control of blade tip clearance. This improved clearance control may enhance stability of the engine systems. Further, the relatively thinner cavity walls 245 surrounding the cooling cavity 240 are more responsive to changes in system dynamics.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a compressor, the method comprising:
   casting a compressor case that is a unitary member that includes:
   a forward annular portion of the case; an aft annular portion of the case; a cavity forward wall extending radially inward from the forward annular portion to a first inner end; a cavity aft wall extending radially inward from the aft annular portion to a second inner end; and
   a cavity outer wall extending axially between the forward and aft annular portions and defining an outer aperture; and
   separately casting a cavity inner wall to define a U-shaped end channel with an axial base, a radial forward leg that is aligned with the cavity forward wall, and a radial aft leg that is aligned with the cavity aft wall, and welding the cavity inner wall to the first and second inner ends of the cavity forward and aft walls,
   wherein a cooling cavity is defined between the cavity forward wall, the cavity aft wall, the cavity outer wall and the cavity inner wall; and
   installing a vane, of a vane stage, within the case so that a trunnion bearing extends radially from a root of the vane to a trunnion bearing outer end, through the inner aperture in the cavity inner wall and the outer aperture in the cavity outer wall.

2. The method of claim 1, comprising:
   casting the cavity outer wall so that the cavity outer wall is thinner than the cavity forward wall, the cavity aft wall and the cavity inner wall.

3. The method of claim 1, wherein installing the vane includes:
   installing a sleeve that surrounds the trunnion bearing and extends from the root to a location that is at or near the trunnion bearing outer end.

4. The method of claim 1, including:
   casting the cavity outer wall with a port for directing airflow into the cooling cavity.

* * * * *